Sept. 12, 1944.　　　A. KRUEGER　　　2,358,170
GRINDER AND JUICER
Filed Aug. 6, 1942
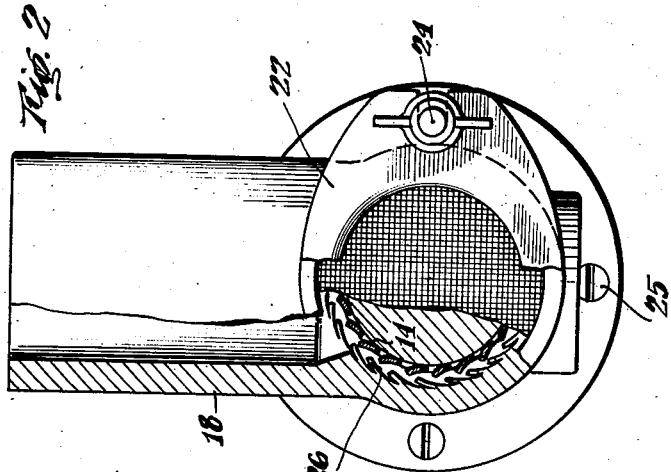
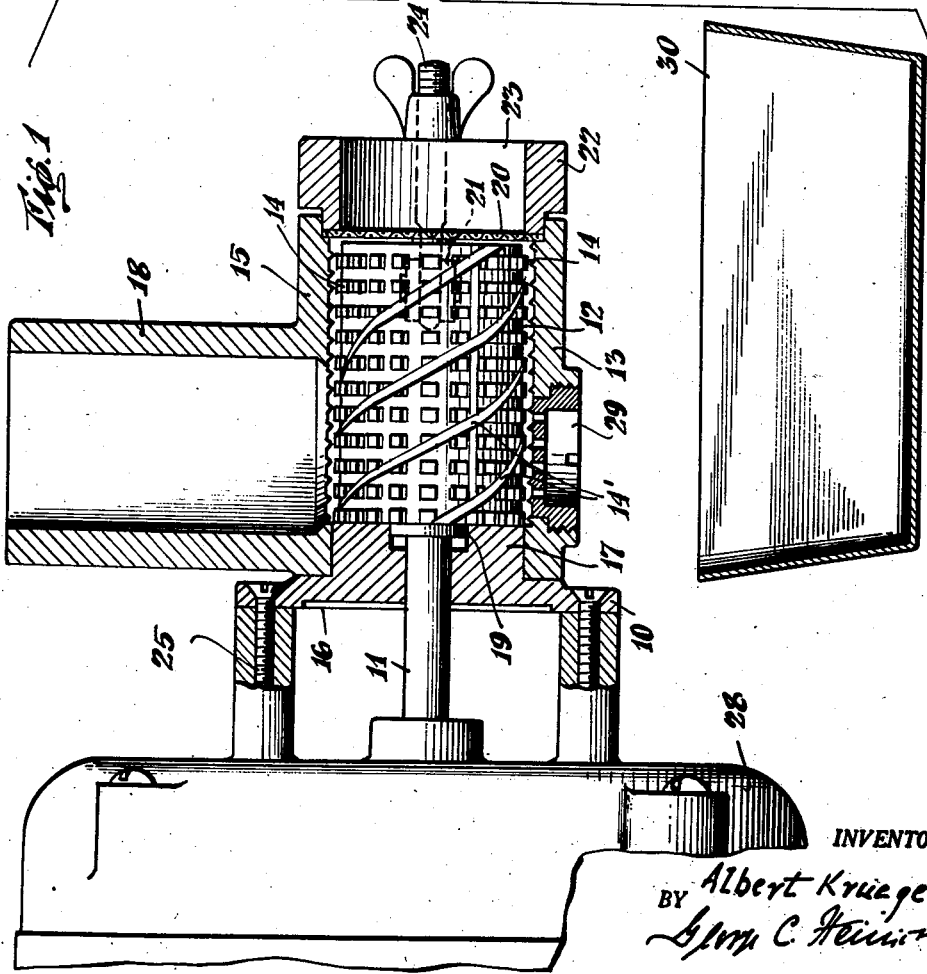
INVENTOR.
BY Albert Krueger
ATTORNEY Patented Sept. 12, 1944

2,358,170

UNITED STATES PATENT OFFICE 2,358,170

GRINDER AND JUICER

Albert Krueger, Oracle, Ariz., assignor to J. H. H. Voss Co., New York, N. Y.

Application August 6, 1942, Serial No. 453,819

2 Claims. (Cl. 146—76)

My invention relates to improvements in motor operated maceraters, grinders or juicers, and it is the principal object of the invention to provide such a device which is comparatively simple and inexpensive in its construction, yet durable and highly efficient in grinding fruits, vegetables, of all kinds and hard nuts to a fine pulp with great rapidity and with practically no great effort as it is driven by a small electric motor which can be connected to any light socket.

Another object of my invention is to provide such a macerater in a housing provided with a bleeder from which the juice is issued to be collected in a suitable receptacle.

These and other objects and advantages of my invention will become more fully known as the description thereof proceeds, and will then be specifically defined in the appended claims.

In the accompanying drawing forming a material part of this disclosure:

Fig. 1 is a fragmentary top plan view, partly in section of a macerater constructed according to my invention.

Fig. 2 is a fragmentary, sectional end elevation of the macerater.

As illustrated, a face plate 10 is attached to an electric motor 28 of about ⅛ or ¼ HP. running 3500 or even 10,000 R. P. M. The motor shaft 11 protrudes through a center hole in plate 10. A solid roller 12 is fitted and fastened to shaft 11. The roller 12 revolves within a housing 13 with just enough play between its teeth 14 and the teeth 26 on the wall 15 of the housing 13, so that only very small particles can pass at that point. The housing 13 is pressed up against the surface 16 of the plate 10 and fits snugly over the barrel 17 of the plate 10. The housing 13 has an upright extension 18 which serves to hold the material to be pressed down against the rotary roller held in place or position by means of the flange 22 with an opening 23 through which liquid and pulp flows after passing through the juicer. The parts are assembled and firmly held together by bolts 24. The face plate 10 is fastened to the motor by means of screws 25. As shown in Fig. 2, the teeth 14 on the rotor roller 12 co-operate with the teeth 26 on the wall 15 of the housing 13 and the teeth 26 face in a direction opposite to the teeth 14.

A bleeder 29 is provided at the bottom of the housing 13 through which the smooth pulp or vegetable juice issues nearly as smooth as tomato juice and is collected in a vat 30 beneath the bleeder.

The operation and use of my simple macerater will be entirely clear from the above description by having simultaneous reference to the drawing, and it will be clear that I have produced a juicer of the most simple and inexpensive construction, yet smoothly operating to crush even the hardest vegetable matter. In operation, upon the start of the motor, the rotation of its shaft will rotate the roller secured thereto within its housing to which the matter to be macerated is fed through the hopper 18 by means of the pusher 27. The matter will then be ground or macerated between the teeth on the roller 12 and the teeth on the inner wall of the housing 13, and the resulting pulp will be pressed through the screen and can then be removed through the opening 23, while the juice will flow off through the bleeder 29 via the helical grooves 14' of the roller. The juice will follow its natural tendency to escape through the most convenient exit which is through bleeder 29 at the bottom of the housing while the screen is mostly clogged by the pulp under the pressure of the pusher 27, and only a very small portion of the juice will escape with the pulp through the screen.

The roller rotating within the housing in close proximity of the wall of the housing will compel the juice to follow the most convenient path, i. e. through the grooves 14', while a small portion of the juice will flow through the interstices between the individual rows of teeth on the roller to the nearest exit, i. e. the bleeder 29.

It will be understood that I have described and shown the preferred form of my invention as one example only of the many possible ways to practically construct the same, and that I may make such changes in its general arrangement and in the construction of the minor parts as come within the scope of the appended claims without departure from the spirit of my invention and the principles involved.

Thus, for instance, the roller 12 can be provided with a plurality of helical grooves 14' which co-operate with the circular grooves between the individual rows of teeth to facilitate the flow of the extracted juice to the bleeder.

Having thus described my invention, what I claim as new and desire to secure by Letters Patent is:

1. In a grinder and juicer as described principally intended for household use, a solid roller having a macerating outer mantle having its teeth equally distributed over its entire surface, a motor on the shaft of which said roller is mounted, a housing for said roller having teeth on its inner wall equally distributed thereon co-operating with the said macerating mantle of the roller, an extension for said housing through which the material to be ground is fed to said roller by a pusher, another extension for said housing closed by a screen for the removal of the juice, a means for removing the pulp, and a means for collecting the juice.

2. In a macerator as described principally intended for household use, including an electromotor and its shaft, a grinder roller equipped with a plurality of grinding teeth equally distributed on the entire face of the roller, circular and helical grooves between said teeth and arranged on said motor shaft, a housing for said roller having teeth equally distributed on the face of its inner wall in close proximity to the teeth on said roller and co-operating therewith to grind the material fed to said roller through an extension of said housing, a screen in said housing near the end of said roller, a cleaner for keeping said screen clean, and a flange on said housing for keeping said screen in place and having an opening for the escape of the pulp residue of the macerating process, and a bleeder at the bottom of the housing for the discharge of the juice.

ALBERT KRUEGER.